United States Patent
Yonemura

[11] Patent Number: 6,052,960
[45] Date of Patent: Apr. 25, 2000

[54] WATER CUTOFF JUNCTION MEMBER FOR CONCRETE PRODUCTS TO BE JOINED TOGETHER

[75] Inventor: Masatsugu Yonemura, Kumamoto, Japan

[73] Assignee: Yamax Corp., Kumamoto, Japan

[21] Appl. No.: 08/960,370

[22] Filed: Oct. 29, 1997

[30] Foreign Application Priority Data

Jan. 11, 1996 [JP] Japan .................................. 8-292009

[51] Int. Cl.[7] ........................... E04B 1/684; E01C 11/02
[52] U.S. Cl. ................................. 52/393; 404/69; 404/47
[58] Field of Search .......................... 52/396.07, 396.03, 52/396.04, 396.05; 404/69

[56] References Cited

U.S. PATENT DOCUMENTS

| 3,742,669 | 7/1973 | Mansfeld | 52/396 |
|---|---|---|---|
| 3,775,921 | 12/1973 | Avera | 52/471 |
| 3,994,609 | 11/1976 | Puccio | 404/69 |
| 4,067,660 | 1/1978 | Puccio | 404/69 |
| 4,154,041 | 5/1979 | Namy | 52/573 |
| 4,305,680 | 12/1981 | Rauchfuss, Jr. | 404/69 |
| 4,423,979 | 1/1984 | Brown | 404/69 |
| 4,743,139 | 5/1988 | Spavin | 404/65 |
| 4,774,795 | 10/1988 | Braun | 52/396 |

FOREIGN PATENT DOCUMENTS

| 2283994 | 4/1976 | France . |
|---|---|---|
| 8913260 | 2/1991 | Germany . |
| 8605322 | 10/1993 | Germany . |

*Primary Examiner*—Carl D Fredman
*Assistant Examiner*—Jennifer I. Thissell
*Attorney, Agent, or Firm*—McDermott, Will & Emery

[57] ABSTRACT

In order to join concrete products to be joined together each having an joining face, an opening formed in the joining face, and an attachment hole communicating with the opening, a junction member body has on its at least one end a swelled protruding portion which is inserted through the opening into the attachment hole. The junction member body further has a plurality of spaces for cleavage extending along the direction of thickness of the junction member body, each of the spaces for cleavage being cleaved open by an external force caused by an earthquake or the like, to present satisfactory extensibility and collapsibility.

10 Claims, 6 Drawing Sheets

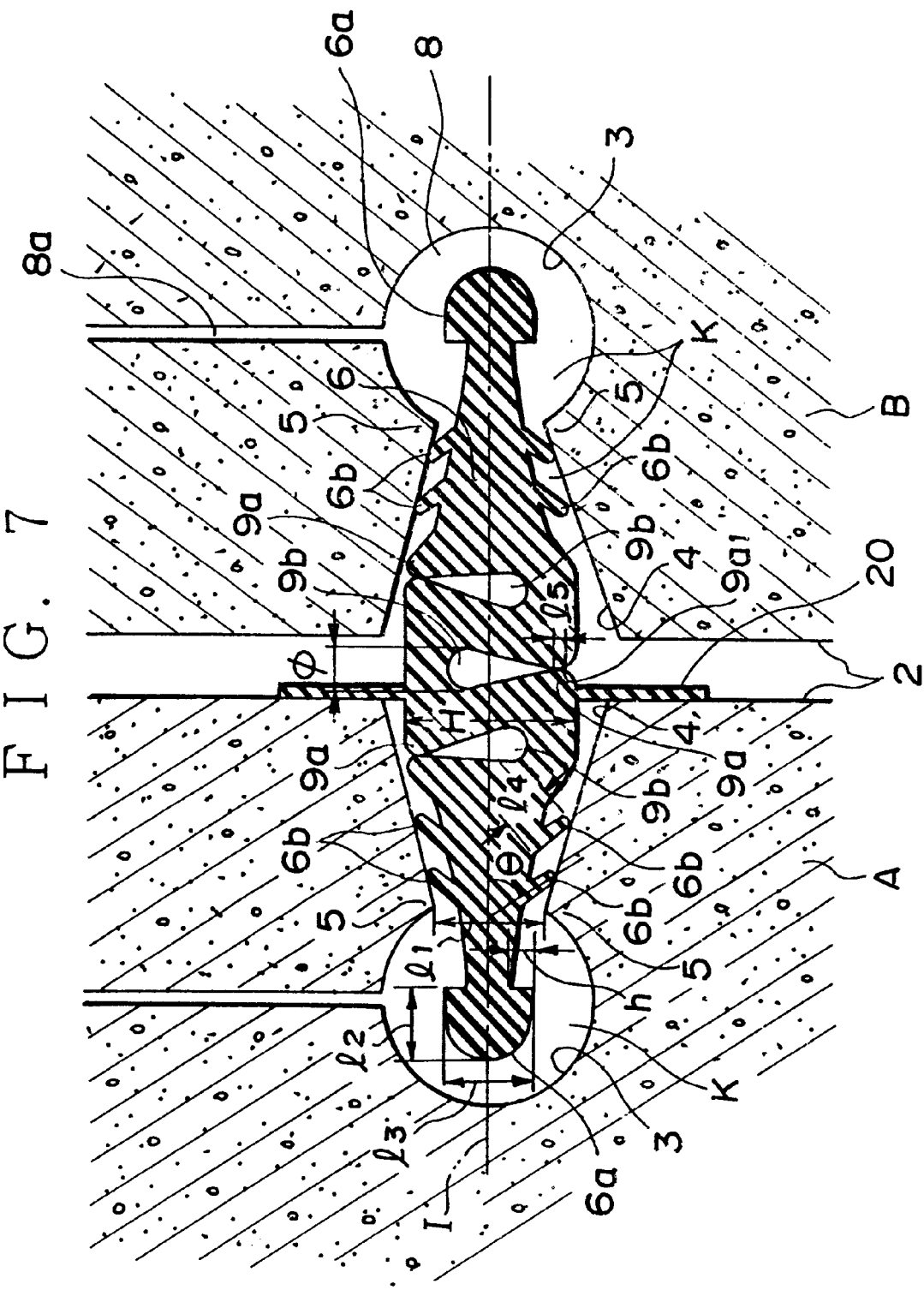

WATER CUTOFF JUNCTION MEMBER FOR CONCRETE PRODUCTS TO BE JOINED TOGETHER

BACKGROUND OF THE INVENTION

1. Field of the Invention

The present invention relates generally to a water cutoff junction member for concrete products to be joined together, and more particularly to a junction member capable of simply and securely joining concrete products including for example construction materials for underground structures such as concrete box culverts, side channels, U-shaped channels, sewage pipes and common channels, construction materials for ground structures such as tunnels and retaining walls, and building materials such as outside wall panels, inside wall panels and slabs, thereby contributing to improved earthquake-resistant and water cutoff properties.

2. Description of the Related Art

A joining method of joining together concrete products including construction materials such as box culverts, side channels and U-shaped channels must conventionally meet the requirements (a) having a rigid connectivity ensuring a structural integration of the concrete products to be joined together; (b) having a flexibility at the joining points of the concrete products to be joined together in order to ensure earthquake resistant properties; and (c) having water cutoff properties for preventing any leakage of liquid.

In order to ensure the earthquake resistant properties of the underground structures such as the box culverts and the side channels in response to a distortion in the ground caused by a ground displacement like a lateral flow which may occur upon the great earthquake, a method has been recently turned out to be advantageous in which the rigidity of the underground structures is lowered to absorb the deformation of the ground in the form of as flexible structures as possible. In this case, satisfactory water cutoff properties must be secured even though the joining sections of the underground structures have been subjected to a large displacement.

However, there have hitherto existed no joining methods satisfying all the requirements (a) to (c) described above.

Up until now, the underground structures have been joined together by way of example using a joining method as illustrated in FIG. 8.

This method employs a packing 51 or an O-ring made of rubber or synthetic resin and disposed within a receiving port 50a at the front end of a receiving pipe 50 which is a concrete product A to be joined on one hand, into which receiving port 50a there is inserted an insertion pipe 52 which is a concrete product B to be joined on the other hand.

Another method is illustrated in FIG. 9, in which concrete products A and B have on their outer sides attachment parts 53 which are fastened together by means of bolts 54 and nuts 55, with a packing 56 made of rubber or the like intervening by contact bonding between the joining faces 2 of the concrete products A and B to be joined together to thereby achieve a water cutoff function.

In the case of the conventional method of joining the underground structures in the form of the concrete products A and B to be joined together by inserting the insertion pipe 52 via the packing 51 made of rubber or the like into the receiving port 50a of the receiving pipe 50 as shown in FIG. 8, design requirements must be satisfied which includes securing a clearance in the receiving port 50a of the receiving pipe 50, having a friction resistance enough to prevent the packing 51 from being disengaged from the receiving port 50a in its natural connecting state, as well as having to set the press-in limit pressure of the insertion pipe 52 to the maximum. Also, in this joining method, the joining section between the receiving pipe 50 and the insertion pipe 52 is poor in follow-up properties in response to an external force such as tensile force or compressive force which may be caused by a displacement and distortion of the ground and vibrations upon an earthquake, resulting in a water leak through a gap between the packing 51 and the receiving pipe 50 and the insertion pipe 52, thus making it impossible to obtain satisfactory water cutoff properties.

In the case of another joining method as shown in FIG. 9 in which by fastening the bolts 54 and the nuts 55 together the packing 56 made of rubber or the like is contact bonded 6 to the joining faces 2 of the concrete products A and B to be joined, the flexibility between the joined concrete products A and B are remarkably impaired, resulting in poor earthquake resistant properties. Also, the water cutoff function is merely effected by a contact bonding force of such a level as to impart an elastic deformation to the packing 56, resulting in insufficient water cutoff properties.

In addition, the joining method illustrated in FIG. 9 entailed deficiencies that it requires a large number of components, a skilled technique for joining the concrete products A and B to be joined together, and a lot of time and labor for the joining work, leading to poor workability and inefficiency as well as a raise in construction costs, material costs and production costs.

SUMMARY OF THE INVENTION

The present invention was accomplished in order to overcome the above deficiencies.

It is therefore the object of the present invention to provide a water cutoff junction member for concrete products to be joined together, by means of which an unskilled person can perform a work for joining the concrete products to be joined together with a simple handling operation and in a short time by precisely inserting in position a protruding portion provided on at least one end of a junction member body into an attachment hole communicating with a joining face of the concrete product, the water cutoff junction member having an improved rigid connectivity at the joined sections, improved follow-up properties for an external force arising from an earthquake or vibrations, superior water cutoff properties and a less number of components, and easy to produce and design and capable of reducing production costs, construction costs and material costs.

In order to attain the above object, in accordance with the present invention, there is provided a water cutoff junction member for concrete products to be joined together comprising: a junction member body made of an elastic material; said concrete products each including a joining face, an opening formed in said joining face, and an attachment hole communicating with said opening, wherein said junction member body includes: a swelled protruding portion formed on at least one lateral end of said junction member body, said swelled protruding portion being inserted through said opening into said attachment hole; and a plurality of spaces for cleavage extending along a direction of thickness orthogonally intersecting the longitudinal direction of said junction member body.

According to the present invention, at least one end of a junction member body made of an elastic material has a swelled protruding portion intended to be inserted through an opening formed in the joining faces of the concrete products to be joined together into an attachment hole communicating with the opening, the junction member body being provided with spaces for cleavage which are pointed toward the thickness direction substantially orthogonally intersecting the longitudinal direction of the junction member body and each of which has a closed end at its outer portion, whereby upon joining the concrete products to be joined together the junction member body made of an elastic material can be integrated ensuring an easy and secure insertion of the protruding portion into the attachment hole at a predetermined position without being inadvertently bent. Afterwards, grout is filled into the attachment hole and set to fasten the protruding portion within the attachment hole, thus making it possible for an unskilled person to effectively perform a work for joining the concrete products to be joined together in a short time with a simple handling operation.

Also, after joining the concrete products to be joined together, satisfactory rigid connectivity is ensured between the joined concrete products. Furthermore, in the case of application of external force than needed as a result of an earthquake or vibration, the joining parts provided on the outer portions of the spaces for cleavage extending in the thickness direction of the junction member body are broken to allow the junction member body to cleave open like bellows, whereupon follow-up properties at the joining sections between the concrete products to be joined for an earthquake or the like are improved ensuring good extensibility and collapsibility as well as good water cutoff properties.

Moreover, only the junction member body made of an elastic material and the grout are used for joining the concrete products to be joined together, contributing to a reduced number of components and a simple production and design, as well as to a curtailment in production costs, construction costs and material costs.

The above and other objects and features of the present invention will be more apparent from the following description taken in conjunction with the accompanying drawings.

BRIEF DESCRIPTION OF THE DRAWINGS

FIG. 7 is an enlarged perspective view of a fourth embodiment of the junction member body in accordance with the present invention, which is now in use for joining concrete products to be joined together;

DESCRIPTION OF THE PREFERRED EMBODIMENTS

Figure 1:
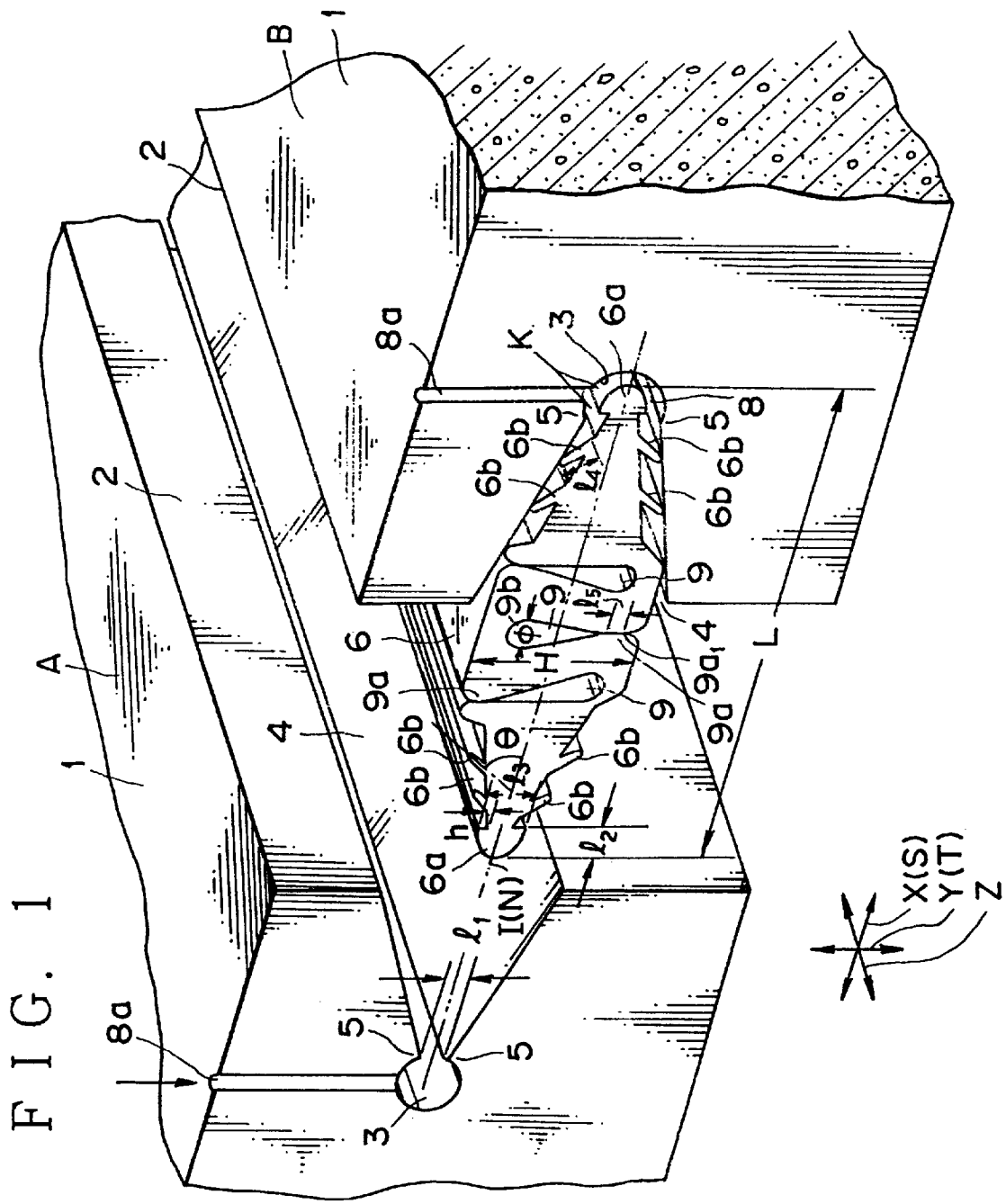
FIG. 1 is an enlarged perspective view of a first embodiment of a junction member body in accordance with the present invention, which is now in use for joining concrete products to be joined together.
Figure 4:
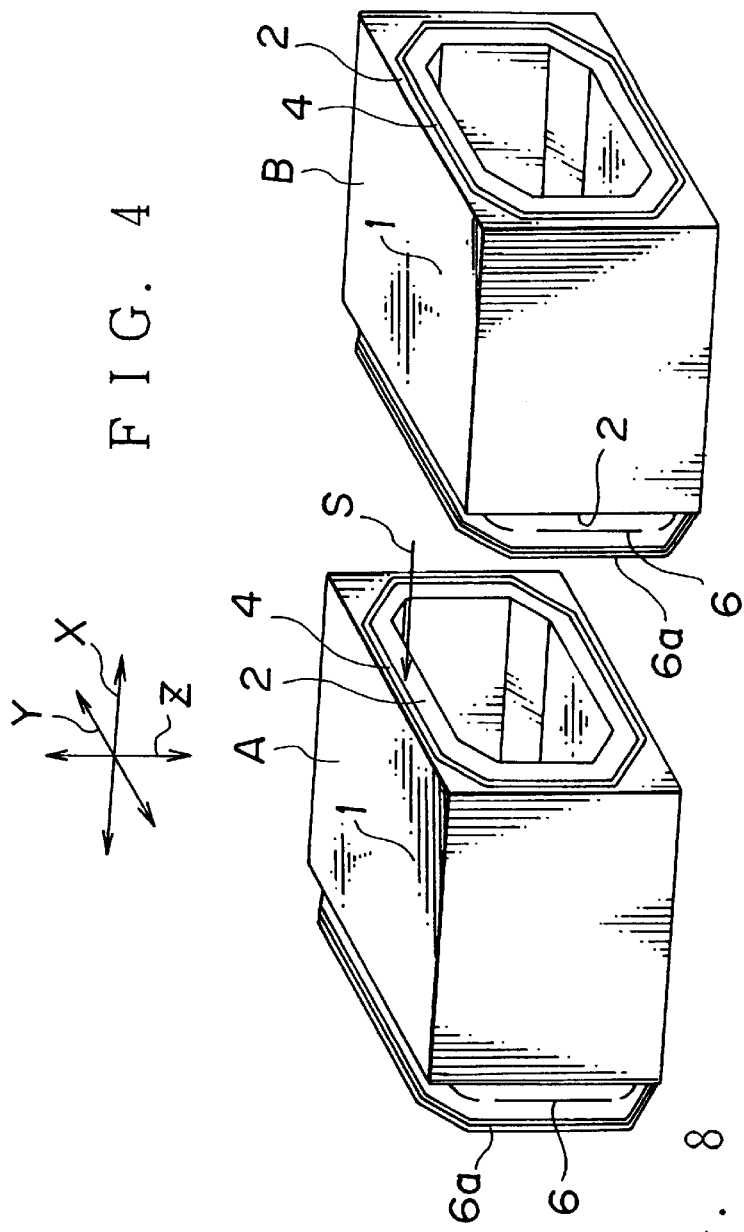
FIG. 4 is a general perspective view of the concrete products which are being joined together by use of the junction member body.
Figure 8:
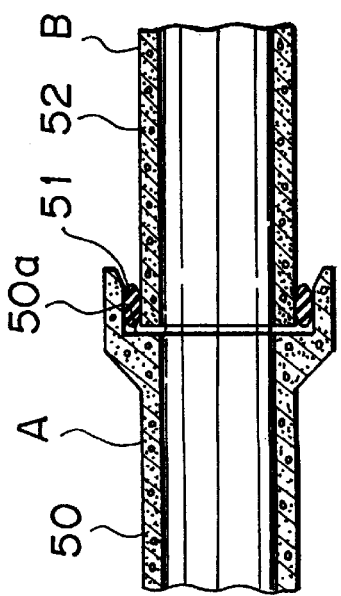
FIG. 8 is a sectional view showing by way of example a conventional joining method for joining the concrete products together.

Referring to FIGS. 1 and 4, particularly to FIG. 4, concrete products A and B to be joined together are in the form of a pair of box culverts 1 having joining faces 2 which are to be fayed at the time of juncture.

Figure 2:
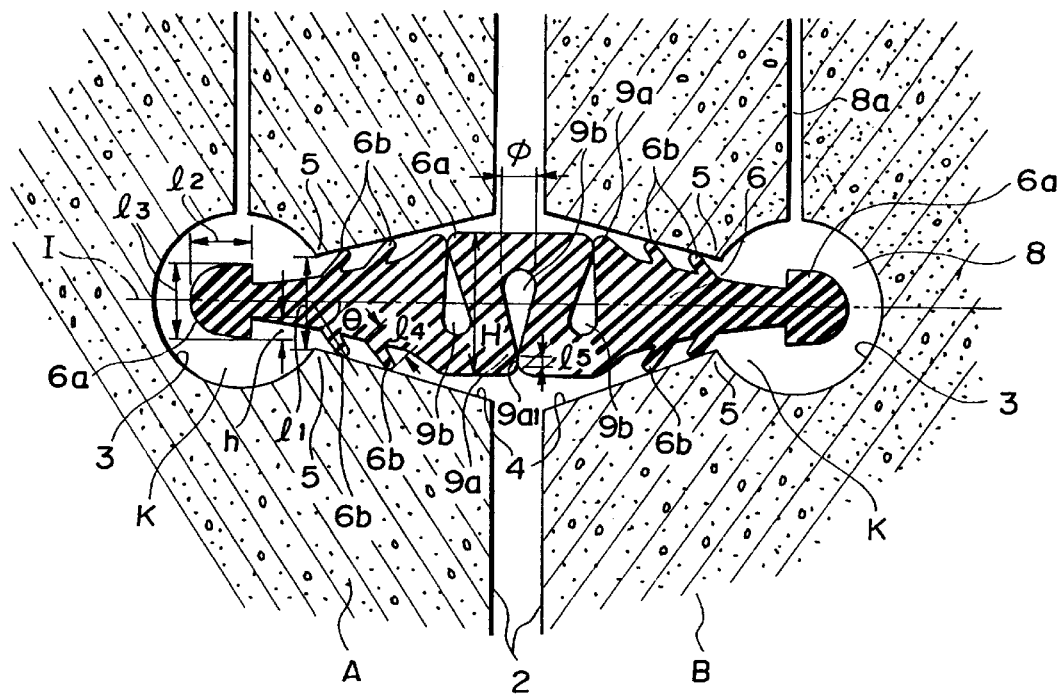
FIG. 2 is an enlarged longitudinal section of the first embodiment in which protruding portions provided on the lateral ends of the junction member body are positioned in attachment holes of the concrete products to be joined together.

At least one of the concrete products A and B to be joined together includes substantially a circular opening 4 formed in the joining face 2. The opening 4 leads to an attachment hole 3 having substantially a circular section of an enlarged diameter as shown for example in FIGS. 1 to 3 in order to receive a protruding portion 6a of substantially a circular contour in front view formed at at least one end of a junction member body 6 which will be described later.

The opening 4 is tapered in section toward the enlarged diameter attachment hole 3 and has a narrow part or a neck 5 at the boundary between the attachment hole 3 and the opening 4, with 1 being a minimum vertical dimension of the opening 4.

The junction member body 6 is made of a synthetic resin elastic material and is circular in front view as described above. At least one end of the junction member body 6 is provided with the swelled protruding portion 6a which is intended to be inserted into the attachment hole 3 through the opening 4 formed in the joining face 2 of the concrete product A to be joined. The other end of the junction member body 6 is attached to the concrete products B to be joined on the other end.

In this embodiment, both ends of the junction member body 6 are provided with the swelled protruding portions 6a each having substantially a semi-elliptical section as shown. The elastic material to make the junction member body 6 can be for example not only rubber or synthetic resin but also knitted inorganic fibers such as glass fibers and carbon fibers. The junction member body 6 of this embodiment has dimensions of approx. 17 mm in thickness H and approx. 75 mm in overall length L from the edge of the protruding portion 6a on one hand to the edge of protruding portion 6a on the other hand. The junction member body 6 is further provided with a plurality of, three in the illustrated example, spaces 9 for cleavage which will be described later each having an effective design length of approx. 18 mm in the direction of the longitudinal axis I. The protruding portion 6a is of a length 12 of approx. 6.6 mm in its major axis direction and a length 13 of approx. 8.5 mm in its minor axis direction. The narrow part of the protruding portion 6a has a height h of at least 2 mm in its thickness direction.

The junction member body 6 is further provided with a plurality of lip-like closing press contact portions 6b located rearward of the protruding portion 6a, each closing press contact portion 6b having a length 14 and extending outward beyond the level of the protruding portion 6a and diagonally in a lockable manner at a desired design angle θ relative to the direction S of insertion of the protruding portion 6a into the attachment hole 3. In the illustrated embodiment the protruding portion 6a is followed by two upper and two lower closing press contact portions 6b. The design angle theta of the lip-like closing press contact portions 6b are most preferably 45 to 60° in order to facilitate the insertion of the protruding portion 6a into the opening 3 and to prevent the closing press contact portion 6b from being disengaged from the opening 4.

When the closing press contact portions 6b come into press contact with the inner surface of the opening 4, an airtight condition is achieved within the interior of the attachment hole 2 and the opening 4.

A space K is defined between the inner surface of the attachment hole 3 and the outer peripheral surface of the protruding portion 6a of the junction member body 6 inserted into the attachment hole 3, the space K serving as an introduction passage 8 for introducing grout 7. When the grout 7 has been filled into the interior of the introduction passage 8 and set, the concrete products A and B to be jointed together are interconnected by way of the junction member body 6.

Figure 3:
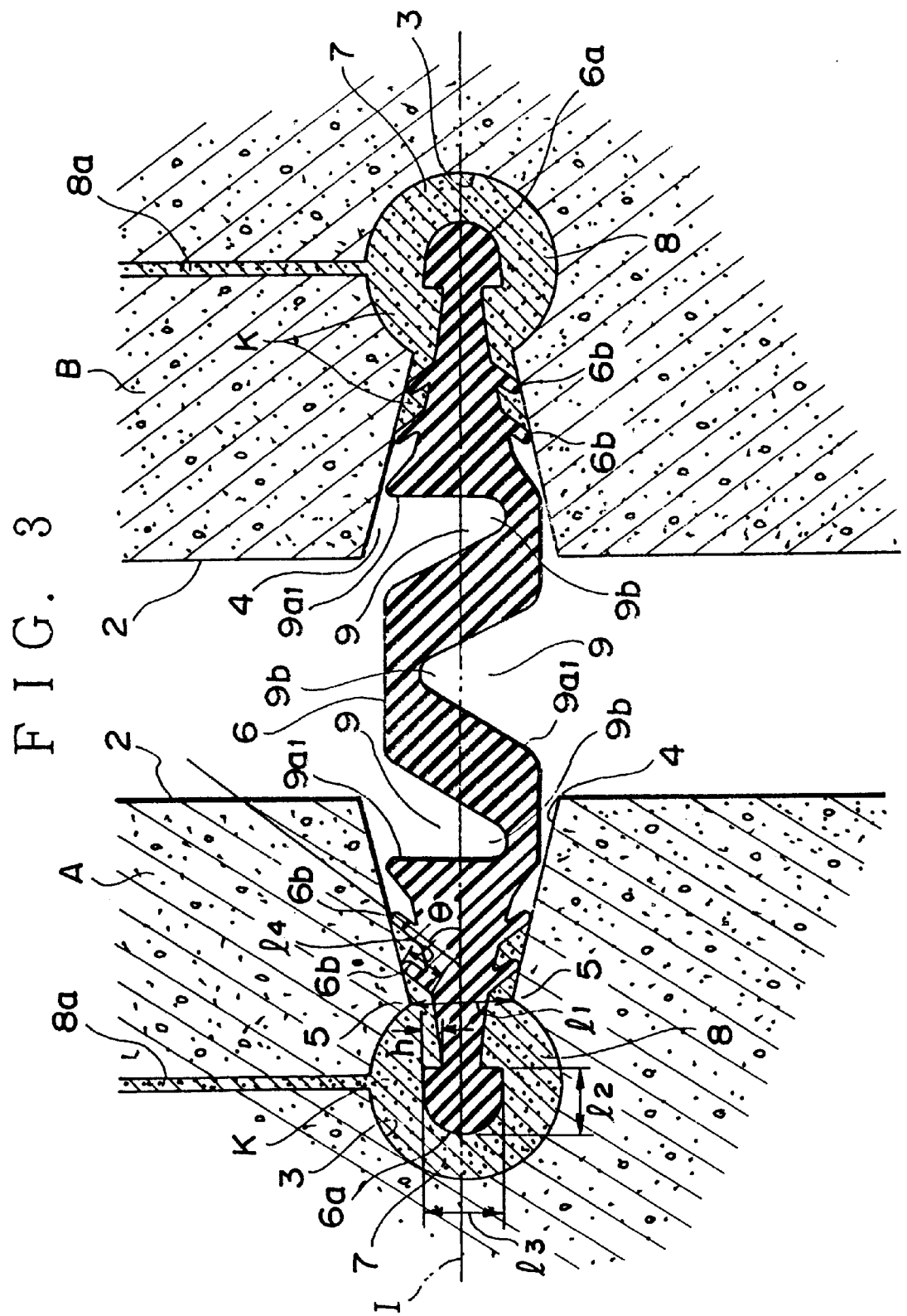
FIG. 3 is an enlarged longitudinal section of the first embodiment in which the concrete products are joined together by way of the junction member body, with its spaces for cleavage being opened.

The junction member body 6 is provided with a plurality of, three in the illustrated example, spaces 9 for cleavage described above which extend in the thickness direction T to substantially orthogonally intersect the longitudinal axis I. Each of the spaces 9 for cleavage includes a closed 65 end 9a formed at the outer portion of the junction member body 6 and having opposed joining parts 9a1 of a desired length 15, and a wide part 9b formed at the inner portion thereof. The spaces 9 for cleavage adjoining each other in the longitudinal direction I are oppositely directed and extend beyond the central axis N in the thickness direction of the junction member body 6. It is most preferable that the length of the joining parts 9a1 to be joined separatably to each other be approx. 1 mm or less in order to ensure that the junction member body 6 presents sufficient rigidity upon the juncture of the concrete products A and B to be joined and to facilitate the integral insertion of the protruding portions 6a into the corresponding attachment holes 3 at their predetermined positions. Also, when the spaces 9 for cleavage are opened as a result of the lateral separation of the joining parts 9a1, in the case of application of an external force such as a tensile force or a compressive force greater than a predetermined magnitude upon movement, distortion and vibration of the ground due to earthquake, the junction member body 6 will present improved extensibility and collapsibility in all directions generally in the form of bellows as shown in FIG. 3, thereby ensuring an improved follow-up ability of the junction member body 6 to the external force which will be applied thereto upon the earthquake or the like, thus obtaining improved water cutoff properties of the junction member body 6 for the concrete products A and B to be joined together.

The wide part 9b of the space 9 for cleavage is shaped into an arc in section as shown, with the diameter phi of the order of 4 mm.

The grout 7 can be for example a non-shrinkable cement mortar, but may be a liquid rubber or a synthetic resin. As described above, the grout 7 is externally filled into the space K serving as the introduction passage 8 defined between the inner surfaces of the attachment holes 3 and the outer surfaces of the protruding portions 6a located at both ends of the junction member body 6, and is set. More specifically, the grout 7 is filled through an introduction port 8a into the spaces K in the concrete products A and B by means of a filling machine.

X represents a joining direction in which the concrete products A and B are joined together, Y represents a direction vertically intersecting the joining direction X, and Z represents a direction horizontally intersecting the joining direction X.

An embodiment of the present invention is thus configured. Description will then be made of an example of a method of joining the concrete products A and B to be joined together, as well as its operative function in the sequence of processes.

In order to join at a laying site the concrete products A and B to be joined together in the form of a pair of box culverts 1, the protruding portions 6a at the ends of the junction member body 6 of an elastic material such as rubber or synthetic resin are first inserted through substantially the circular openings 4 formed in the joining faces of the confronting box culverts 1 into the interior of the attachment hole 3 in the joining direction X (see FIG. 1).

At that time, the protruding portions 6a are moved and guided along the joining direction X while keeping the lip-like closing press contact portions 6b, which are formed on the upper and lower surfaces of the junction member body 6 rearward of the protruding portions 6a at both ends in the longitudinal direction I, in contact with the inner surfaces of the openings 4 associated therewith. As a result, upon the insertion of the protruding portions 6a into the attachment holes 3, the protruding portions 6a can be precisely positioned relative to the attachment holes 3 without being inadvertently bent. Furthermore, the junction member body 6 made of an elastic material is provided with the spaces 9 for cleavage extending in the thickness direction T and each having the closed end 9a consisting of the joining parts 9a1 of a predetermined length L5 on its outer portions in the thickness direction T orthogonally intersecting the longitudinal direction I, so that the junction member body 6 can be integrally formed to secure high rigidity. Thus, without any fear of bringing about an inconvenience that the protruding portions 6a may be inadvertently bent within the interior of the attachment holes 3 to deviate the central axis N, the protruding portions 6a can be inserted in position. In this embodiment, the junction member body 6, which is provided with the spaces 9 for cleavage in the thickness direction T each having the closed end 9a on its outer portion ordinarily, has a bending load of 420 g/cm even when the length 15 of the joining parts 9a1 constituting the closed end 9a is 1 mm or less, presenting higher rigidity than the conventional simple bellows-like rubber-made packing having a bending load of the order of 70 g/cm.

Then, once the protruding portions 6a are inserted in position within the attachment holes 3, an airtight condition is achieved within the interior of the attachment holes 3 by virtue of the press contact with the inner surfaces of the openings 4, of the lip-like closing press contact portions 6b disposed rearward of the protruding portions 6a. In addition, the insertion and positioning of the protruding portions 6a in the attachment holes 3 allows the space K to be defined between the protruding portions 6 and the inner surfaces of the attachment holes 3 to form the introduction passages 8 leading to the interior of the openings 4. The grout 7 is then filled through the introduction ports 8a into the space K serving as the introduction passage 8 defined between the inner surfaces of the attachment holes 3 and the outer surfaces of the protruding portions 6a, and is set. At that time, the grout 7 is filled into the space K by means of the filling machine (see FIG. 1). The grout 7 used is preferably a non-shrinkable cement mortar, but liquid rubber or synthetic resin is also available. As described earlier, the lip-like closing press contact portions 6b to be press contacted against the inner surfaces of the openings 4 are formed at a design angle of 45 to 60° relative to the central axis N so as to be firmly retained within the openings 4, so that airtightness is achieved within the attachment holes 3 and the introduction passages 8 even when the filling machine fills the grout 7 under a higher filling pressure. Thus, a prompt and secure filling of the grout 7 is effected in a brief period of time and the grout 7 is prevented from leaking from the attachment holes 3. Furthermore, by virtue of a plurality of (a total of eight in this embodiment; two for each of the upper and lower surfaces associated with each of the two protruding portions 6a) lip-like closing press contact portions 6b which are each shaped to have a length 14 of the order of 1.5 to 2 mm extending outward beyond the level of the protruding portions 6a, a pressure resistance of 1.2 kg/cm2 is achieved upon the application of pressure to the interior of the space K. The number of closing press contact portions 6b is appropriately selected and may be freely increased or decreased depending on the filling pressure level of the grout 7 to be filled into the attachment holes 3, on the design distance from. the end of the opening 4 to the end of the attachment hole 3, and on the length L in the longitudinal direction I of the junction member body 6.

Then, when the grout 7 is filled into the spaces K within the attachment holes 3 and set, the swelled protruding portions 6a of the junction member body 6 made of an elastic material such as rubber, which has been inserted into the attachment holes 3 of substantially a circular section formed in the concrete products A and B to be joined together, are watertightly fixed within the attachment holes 3 due to setting of the grout 7.

In this case, the protruding portions 6a attached to the attachment holes 3 as a result of setting of the grout 7 are firmly fixed to securely prevent any disengagement of the protruding portions 6a from the associated attachment holes 3 and to provide significantly improved water cutoff properties. This is due to the fact that, the swelled protrusions 6a at the ends of the junction member body 6 being each of substantially a semi-elliptical section and located within the substantially circular in section attachment holes 3 of the concrete products A and B to be joined together, which concrete products each have a narrow part or neck 5 at the boundary between the attachment holes 3 and the tapered opening 4 continuous with the attachment hole 3, the protruding portions 6a inserted into the attachment holes 3 have a diameter larger than the width 11 at the narrow parts of the openings 4 and have at the end thereof shoulders of at least 2 mm in height in the thickness direction (see FIG. 3).

The two box culverts 1 are thus joined together in a prompt and secure manner by way of the junction member body 6 made of an elastic material, through a simple handling in which the protruding portions 6a at the ends of the junction member body 6 made of an elastic material are inserted into the attachment holes 3 in the concrete products A and B to be joined together, after which the grout 7 is filled into the spaces K within the attachment holes 3 and set.

Thus, even though an external force such as a tensile force or a compressive force arising from deformation, distortion and vibration of the ground due to earthquake is applied to the joining parts of the concrete products A and B to be joined together in the form of two box culverts 1, the external force can not affect the joining sections of the concrete products A and B to be joined together since the vibration and the like is absorbed by virtue of the elastically recovering ability possessed by the junction member body 6 made of an elastic material such as rubber or synthetic resin.

At that time, the junction member body 6 has rigidity as a result of formation of the closed end 9a having the joining parts 9a1 of a predetermined length 15 of 1 mm or less on the outer portion of the spaces 9 for cleavage provided in the junction member body 6 in its thickness direction, so that the concrete products A and B to be joined together can be structurally firmly joined to each other due to the rigid connection while maintaining the watertight properties by the junction member body 6.

By virtue of the formation, in the thickness direction T substantially orthogonally intersecting the longitudinal direction I of the junction member body 6, of the spaces 9 for cleavage provided with the closed end 9a having the joining parts 9a1 of a predetermined length 15 of 1 mm or less on the outer portion of the junction member body 6 as described above, even though the joining sections of the concrete products A and B to be joined together are subjected to tensile force or compressive force due to external force which may occur upon a strong earthquake or vibration, the joining parts 9a1 can be laterally separated to allow the spaces 9 for cleavage to be laterally cleaved open, whereupon the junction member body 6 tends to have a profile of bellows as shown in FIG. 3.

At that time, this embodiment illustrated in FIGS. 1 to 4 includes three spaces 9 for cleavage, adjoining ones of which are oppositely directed, each space 9 extending beyond the central axis N in the thickness direction T of the junction member body 6, each space 9 having the joining part 9a1 of a predetermined length 15 of 1 mm or less formed on its outer portion to constitute the closed end 9a, each space 9 having the wide part 9b on its inner portion. Therefore, its spaces 9 for cleavage being cleaved open at their respective joining parts 9a1, the junction member body 6 can be of substantially an even thickness over its entire length without causing any unevenness at various portions. Thus, such an inconvenience is overcome that due to its uneven thickness the junction member body 6 is apt to break resulting in a lower break strength, and the junction member body 6 made of an elastic material can acquire improved extensibility and collapsibility in response to any external force. In the case of this embodiment, the junction member body 6 can exhibit a high break strength of 80 kg/cm with high extensibility of 115 mm.

With being joined by way of the junction member body 6, the concrete products A and B to be joined together are capable of being freely extended or collapsed in the longitudinal direction I of the junction member body 6 and in the thickness direction T substantially orthogonally intersecting the longitudinal direction I in response to an external force generated by earthquake or the like, to present an extremely high follow-up ability. In addition, the rigid connectability and the water cutoff properties of the junction member body 6 are also improved.

Figure 5:
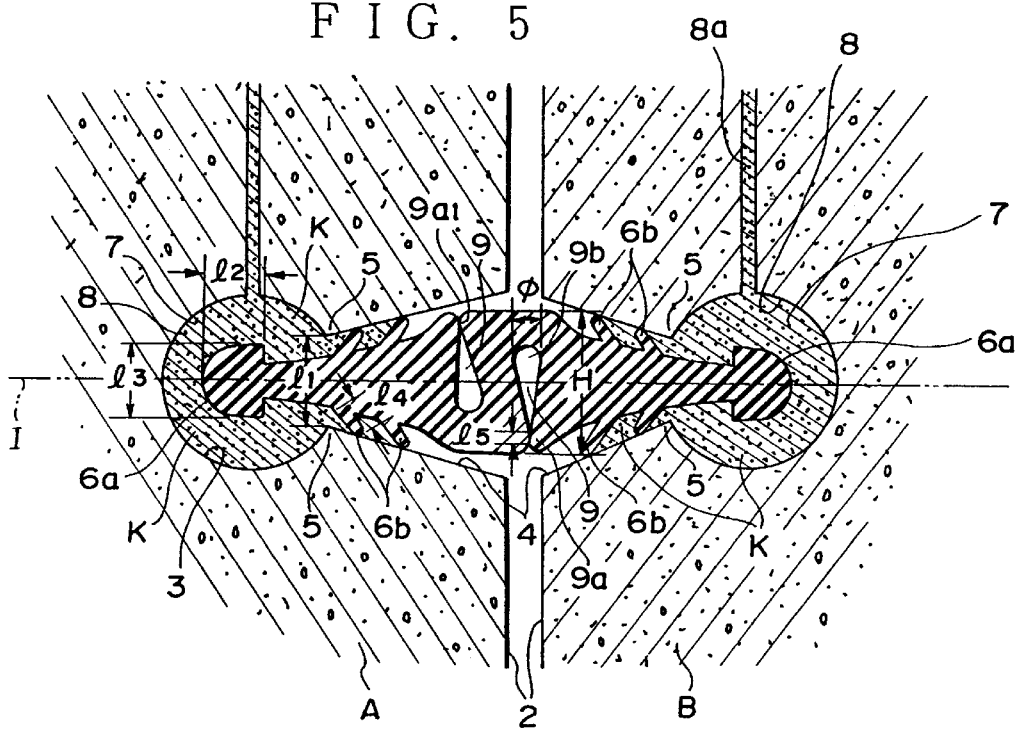
FIG. 5 is an enlarged perspective view of a second embodiment of the junction member body in accordance with the present invention, which is now in use for joining concrete products to be joined together.

FIG. 5 illustrates a second embodiment of the present invention. This embodiment differs from the preceding embodiment in the number of spaces 9 for cleavage to be provided in the junction member body 6 in its thickness direction T. That is, the second embodiment has two spaces 9 for cleavage each one on the upper and lower sides whereas the first embodiment has three spaces 9 for cleavage, two on the upper side and one on the lower side.

In order to join the concrete products A and B to be joined together by means of the junction member body 6, the protruding portions 6a of substantially a semi-elliptical section located at lateral ends of the junction member body 6 are inserted into the attachment holes 3 through the openings 4 in the confronting concrete products A and B to be joined together as shown in FIG. 1. Then, while keeping the closing press contact portions 6b of the junction member body 6 in press contact with the inner surfaces of the openings 4 to secure an airtight condition within the attachment holes 3, the grout 7 is filled into the attachment holes 3 and set, thereby fixing the protruding portions 6a within the attachment holes 3 to prevent the protruding portions 6a from being disengaged from the attachment holes 3 and to realize improved water cutoff properties due to the junction member body 6. The concrete products A and B are thus joined to each other.

Once an earthquake or the like applies greater external force than needed to the joining sections of the concrete products A and B to be joined together, the joining parts 9a1 of a predetermined length 15 located in the outer portion of the space 9 extending in the thickness direction T of the junction member body 6 are laterally separated to cleave the space 9 for cleavage, allowing the junction member body 6 to take a form of bellows to secure high extensibility and collapsibility. Thus, similar to the first embodiment, a structurally rigid connection is obtained with high earthquake-resistant properties.

Figure 6:
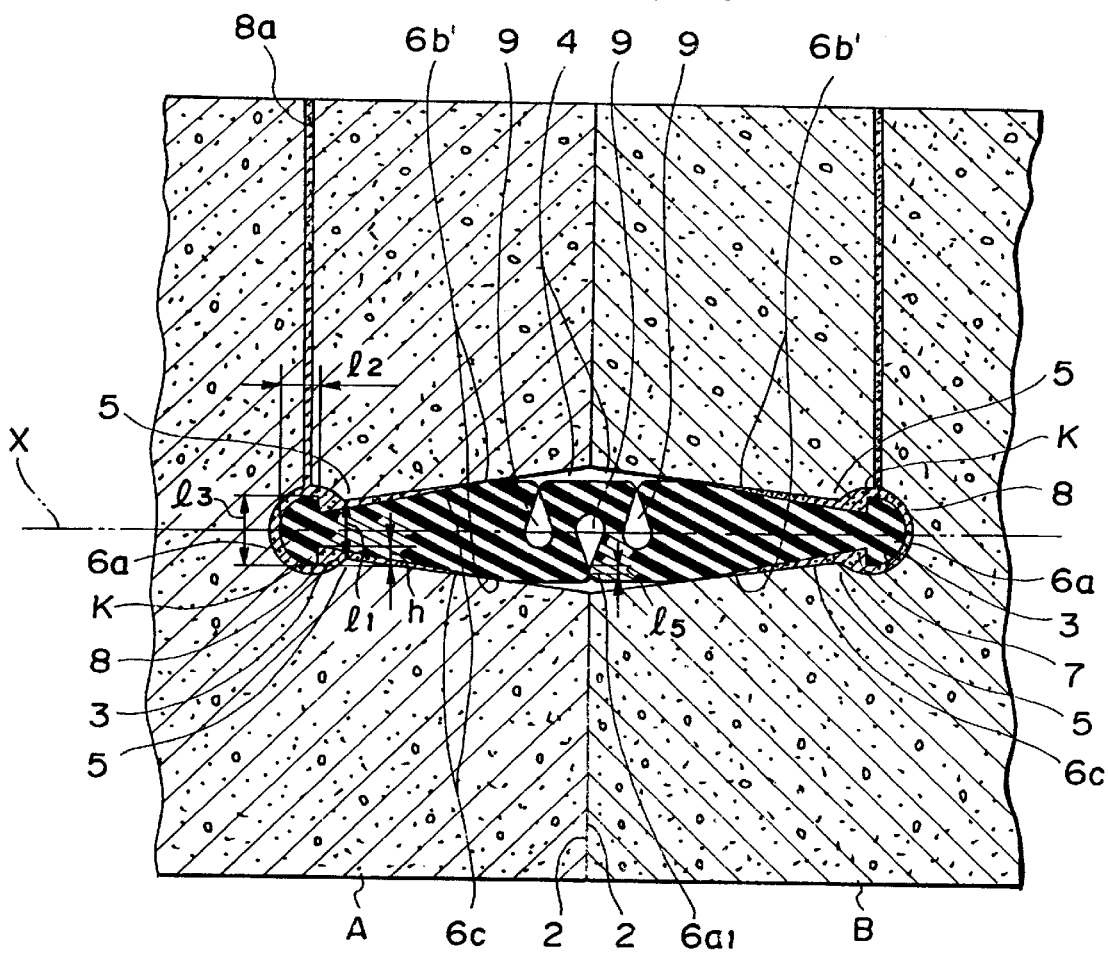
FIG. 6 is an enlarged perspective view of a third embodiment of the junction member body in accordance with the present invention, which is now in use for joining concrete products to be joined together.
Figure 9:
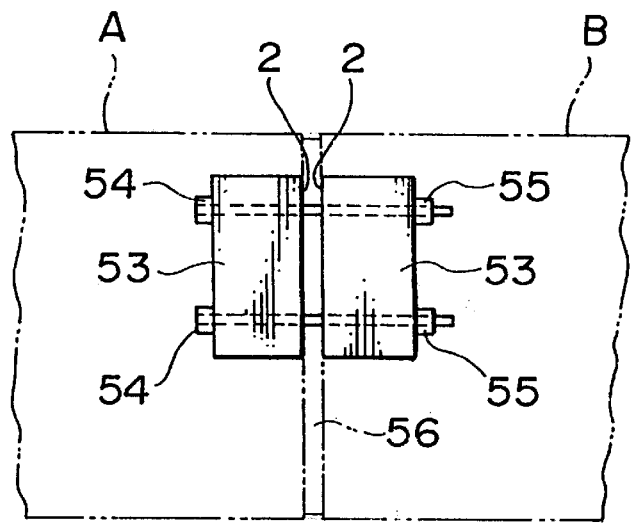
FIG. 9 is a sectional view showing another example of the conventional joining method for joining the concrete products together.

FIG. 6 illustrates a third embodiment of the present invention. The third embodiment differs from the first and second embodiments in that in the former, the junction member body 6 has on its right and left, and upper and lower surfaces a closing press contact portion 6b capable of coming into press contact with the inner surface of the corresponding opening 4 and provided in the form of a tapered surface 6c extending from the shoulder at the end of the protruding portion 6a toward the center of the junction member body 6, to thereby achieve an airtight condition within the attachment holes 3 when the grout 7 has been filled and set, whereas in the latter as detailed hereinabove the junction member body 6 has the closing press contact portions 6b in the form of lips capable of being locked in the directions S in which the protruding portions 6a are inserted, the closing press contact portions 6b being located on the upper and lower surfaces rearward of the substantially semi-elliptical in section protruding portions 6a at the lateral ends of the junction member body 6. The other configurations are substantially the same in all the embodiments, and the same operative functions are ensured.

FIG. 7 illustrates a fourth embodiment of the present invention. This embodiment differs from the preceding embodiments in that in addition to securing the airtightness within the attachment holes 3 merely by keeping the lip-like closing press contact portions 6b in press contact with the inner wall surfaces of the openings 4, the junction member body 6 made of an elastic material such as rubber has on its upper and lower surfaces a sealing wall 20 adapted to come into contact with the joining faces 2 of the concrete products A and B to be joined together, the sealing wall extending in the thickness direction orthogonally intersecting the longitudinal direction I of the junction member body 6, thereby achieving a double sealing structure to securely prevent any leakage of the grout 7 as well as any disengagement of the protruding portions 6a inserted into the attachment holes 3.

Although in the above description of the preferred embodiments the concrete products A and B to be joined together were in the form of the box culverts 1, the present invention is applicable to construction materials for underground structures such as side channels, U-shaped channels, sewage pipes and common channels, and for ground structures such as tunnels and retaining walls, and to building materials such as outside wall panels, inside wall panels and slabs, without being limited to the box culverts 1.

In the above description, the junction member body 6 for use in joining the box culverts I together is exemplarily substantially circular in front views so as to correspond to the openings 4 formed in the joining faces 2. When the concrete products A and B to be joined together are side channels or U-shaped channels, however, the junction member body 6 is formed to have U-shaped ends in front views instead of circular ends.

Although in the above embodiments the spaces 9 for cleavage extending in the thickness direction T substantially orthogonally intersecting the longitudinal direction I of the junction member body 6 made of elastic materials are separately formed to be circular in front views with oppositely directed profiles, the spaces 9 for cleavage may be formed circumferentially spirally on the peripheral surfaces of the junction member body 6, the spaces 9 for cleavage including closed ends 9a each having joining parts 9a1 formed in its outer periphery, whereby upon the insertion of the protruding potions 6a into the attachment holes 3 the junction member body 6 can present a high rigidity to assure the insertion of the protruding portions 6a in position. Thus, when great external force acts on the junction member body 6, the spaces 9 for cleavage are cleaved open to allow the junction member body 6 to take a form of bellows, resulting in improved extensibility and collapsibility, which would be a range within which the prevent invention is applicable.

In the first and second embodiments, a total of eight lip-like closing press contact portions 6b are provided on the lateral end portions of the junction member body 6, each two for right and left, and upper and lower surfaces rearward of the protruding portions 6a. However, the number of the closing press contact portions 6b to be provided is not intended to be limited to this, and the number of provision could be appropriately selected and freely increased or decreased depending on the level of the filling pressure of the grout 7 filled into the attachment holes 3, on the distance from the end of the opening 4 up to the end of the attachment hole 3, and on the length of the junction member body 6 in the longitudinal direction I.

Moreover, in the first to fourth embodiments, the protruding portions 6a are formed on both ends of the junction member body 6 and are inserted into the corresponding attachment holes 3 of the concrete products A and B to be joined together. As an alternative, the junction member body 6 may have only at its one end a single protruding portion 6a to be inserted into the attachment hole 3 of the concrete product A on one side. In this case, the other end of the junction member body 6 is provided with other attachment means, instead of the protruding portion 6a, for instance, with a locking part to be embedded in the other concrete product B or with an anchor by means of which the junction member body 6 is attached to the other concrete product B. Furthermore, although not shown, the junction member body 6 may have the lip-like closing press contact portion 6b only on either the upper or lower surface located rearward of the protruding portion 6a on one hand. In this case also, this closing press contact portion 6b canes into contact with the inner surface of the opening 4 to guide the insertion of the protruding portion 6a, thereby achieving a smooth and secure insertion of the protruding portion 6a into the attachment hole 3 at a predetermined position without causing any bend in the protruding portion 6a. As a result of this, the grout 7 can be filled into the spaces K within the attachment holes 3 without any leakage and set, while keeping the interior of the attachment holes 3 airtight.

What is claimed is:

1. A water cutoff junction comprising:
   at least two concrete products each including a joining face, an opening formed in said joining face, and an attachment hole communicating with said opening; and a junction member body made of an elastic material, said junction member body including a swelled protruding portion formed on at least one lateral end thereof, said swelled protruding portion being inserted through said opening into said attachment hole, and a plurality of cleavage spaces extending along a direction of thickness orthogonally intersecting a longitudinal direction of said junction member body, wherein said at least two concrete products include an introductory port for introducing grout that extends vertically from the top of the concrete products to the end of the attachment hole furthest away from the face, said at least two concrete products include introductory passages for introducing grout from the introductory post, said introductory passages being located between inner surfaces of said attachment holes and outer surfaces of said protruding portion into said attachment holes, said introductory passages being filled with grout to join said at least two concrete products together by said junction member body.

2. A water cutoff junction according to claim 1, wherein said openings are each tapered toward said attachment holes of a large diameter communicating with said openings, and a narrow part is formed at a boundary between said opening and said attachment hole, a width of said narrow part being larger than a maximum width of said protruding portion of said junction member body.

3. A water cutoff junction member for joining concrete products, concrete products each including a joining face, an opening formed in the joining face, and an attachment hole communicating with the opening, said water cutoff junction member comprising:

a junction member body made of an elastic material, said junction member body including:
a swelled protruding portion formed on at least one lateral end of said junction member body, said swelled protruding portion being inserted through the opening into the attachment hole; and
a plurality of cleavage spaces extending along a direction of thickness orthogonally intersecting a longitudinal direction of said junction member body, wherein said junction member body further includes a plurality of closing press contact portions located rearward of said protruding portions for coming into press contact with inner surfaces of the opening to thereby keep an interior of the attachment holes airtight, said closing press contact portions being provided on an upper surface and/or a lower surface.

4. A water cutoff junction member for joining concrete products according to claim 3, wherein said plurality of closing press contact portions extend diagonally outwardly beyond a level of said protruding portion so as to be capable of being locked in a direction of insertion of said protruding portion into the attachment hole, a number of said plurality of closing press contact portions being a desired number.

5. A water cutoff junction member for joining concrete products, concrete products each including a joining face, an opening formed in the joining face, and an attachment hole communicating with the opening, said water cutoff junction member comprising:

a junction member body made of an elastic material, said junction member body including:
a swelled protruding portion formed on at least one lateral end of said junction member body, said swelled protruding portion being inserted through the opening into the attachment hole; and
a plurality of cleavage spaces extending along a direction of thickness orthogonally intersecting a longitudinal direction of said junction member body, wherein said junction member body further includes a closing wall provided on an upper surface and/or a lower surface for coming into contact with the joining faces of the concrete products to keep an interior of the attachment holes airtight, said closing wall extending along the direction of thickness of said junction member body substantially orthogonally intersecting the longitudinal direction of said junction member body.

6. A water cutoff junction member for joining concrete products, concrete products each including a joining face, an opening formed in the joining face, and an attachment hole communicating with the opening said water cutoff junction member comprising:

a function member body made of an elastic material said junction member body including:
a swelled protruding portion formed on at least one lateral end of said junction member body, said swelled protruding portion being inserted through the opening into the attachment hole; and
a plurality of cleavage spaces extending along a direction of thickness orthogonally intersecting a longitudinal direction of said junction member body, wherein said protruding portion has a semi-elliptical profile, and said junction member body has at ends thereof shoulders of 2 mm or more in height in the thickness direction.

7. A water cutoff junction member for joining concrete products, concrete products each including a joining face, an opening formed in the joining face, and an attachment hole communicating with the opening, said water cutoff junction member comprising:

a junction member body made of an elastic material, said junction member body including:
a swelled protruding portion formed on at least one lateral end of said junction member body, said swelled protruding portion being inserted through the opening into the attachment hole; and
a plurality of cleavage spaces extending along a direction of thickness orthogonally intersecting a longitudinal direction of said junction member body, wherein each of said plurality of cleavage spaces has a separable closed end consisting of two joining parts of a desired length at an outer portion in the thickness direction of said junction member body and has a wide part at an inner portion of said plurality of cleavage spaces.

8. A water cutoff junction member for joining concrete products according to claim 7, wherein said plurality of cleavage spaces adjoining each other are oppositely directed.

9. A water cutoff junction member for joining concrete products according to claim 7, wherein each of said plurality of cleavage spaces extends beyond a central axis in the thickness direction of said junction member body.

10. A water cutoff junction member for joining concrete products according to claim 7, wherein said two joining parts located at the outer portion of said plurality of cleavage spaces are each of a length of approximately 1 mm or less.

* * * * *